US012280604B2

(12) United States Patent
Momose

(10) Patent No.: US 12,280,604 B2
(45) Date of Patent: Apr. 22, 2025

(54) RECORDING DEVICE, AND CONTROL METHOD FOR RECORDING DEVICE

(71) Applicant: SEIKO EPSON CORPORATION, Tokyo (JP)

(72) Inventor: Yoshihiko Momose, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 18/153,792

(22) Filed: Jan. 12, 2023

(65) Prior Publication Data

US 2023/0226834 A1 Jul. 20, 2023

(30) Foreign Application Priority Data

Jan. 14, 2022 (JP) ................................ 2022-004071

(51) Int. Cl.
*B41J 25/304* (2006.01)

(52) U.S. Cl.
CPC .................................. *B41J 25/304* (2013.01)

(58) Field of Classification Search
CPC ................................ B41J 11/20; B41J 25/304
See application file for complete search history.

(56) References Cited

U.S. PATENT DOCUMENTS

2006/0192798 A1* 8/2006 Kuki ...................... B41J 25/308
347/8

FOREIGN PATENT DOCUMENTS

JP 2020-062828 A 4/2020

* cited by examiner

*Primary Examiner* — Thinh H Nguyen
(74) *Attorney, Agent, or Firm* — WORKMAN NYDEGGER

(57) ABSTRACT

A recording device including a medium support portion for supporting a medium, a recording unit for recording on the medium, a movement unit configured to move relative to the medium support portion along a first axis, and a detector attached to the movement unit.

9 Claims, 11 Drawing Sheets

RECORDING DEVICE, AND CONTROL METHOD FOR RECORDING DEVICE

The present application is based on, and claims priority from JP Application Serial Number 2022-004071, filed Jan. 14, 2022, the disclosure of which is hereby incorporated by reference herein in its entirety.

BACKGROUND

1. Technical Field

The present disclosure relates to a recording device, and a control method for a recording device.

2. Related Art

In the past, a mechanism for adjusting a positional relationship between a printing medium and a recording unit in a recording device has been known. For example, JP 2020-62828 A discloses a configuration for detecting a height of an upper end of a printing medium in order to adjust a distance in a vertical direction between the printing medium and an ink jet head. An ink-jet printer disclosed in JP 2020-62828 A includes a table on which the printing medium is placed, a holding member that holds an ink jet head, and a detection member attached to the holding member, and by the detection member contacting the printing medium and rotating, a height of the printing medium is detected.

In the configuration disclosed in JP 2020-62828 A, recording is performed by causing the ink jet head held by the holding member to scan the printing medium. The detection member hangs below the holding member at a position outside a scanning range of the ink jet head. In this configuration, the detection member needs to be disposed at a position that does not interfere with the scanning by the ink jet head, and thus the detection member protrudes to an end portion of the holding member. Therefore, there has been a problem that a mechanism around the table is difficult to reduce in size.

SUMMARY

An aspect to solve the problem described above is a recording device including a medium support portion configured to support a medium, a recording unit configured to perform recording on the medium, a movement unit configured to move relative to the medium support portion along a first axis, and a detector attached to the movement unit, wherein the detector includes an arm portion rotatably coupled to the movement unit, a contact portion fixed to one end of the arm portion, and a displacement detector for detecting a displacement of the contact portion, the contact portion is disposed at a position overlapping the medium support portion in a second axis orthogonal to the first axis, the arm portion is at a non-contact position along the first axis when the contact portion does not contact the medium, and rotates about a rotational movement shaft by the contact portion contacting the medium while the movement unit moves, and the displacement detector detects whether the arm portion is at the non-contact position or not.

Another aspect to solve the above-described problem is a method for controlling a recording device including a medium support portion for supporting a medium, a recording unit for recording on the medium, a movement unit configured to move relative to the medium support portion along a first axis, a contact portion provided at a lower end of the movement unit and rotatable with respect to the movement unit, a displacement detector for detecting a displacement of the contact portion, and a height movement mechanism for changing a height of the medium support portion relative to the movement unit, the method for control including moving the movement unit in either a first direction along the first axis, or a second direction opposite to the first direction, interrupting the movement of the movement unit when the displacement detector detects that the contact portion contacts the medium and rotates while the movement unit moves, reducing the height of the medium support portion by the height movement mechanism, causing the movement unit to resume the movement, and causing a change amount of the height of the medium support portion when the displacement detector detects that the contact portion rotates to be a change amount varying depending on whether a movement direction of the movement unit is the first direction or the second direction.

DESCRIPTION OF EXEMPLARY EMBODIMENTS

1. Overall Configuration of Recording Device

Hereinafter, a recording device 1 according to an exemplary embodiment will be described with reference to the accompanying figures.

Figure 1:
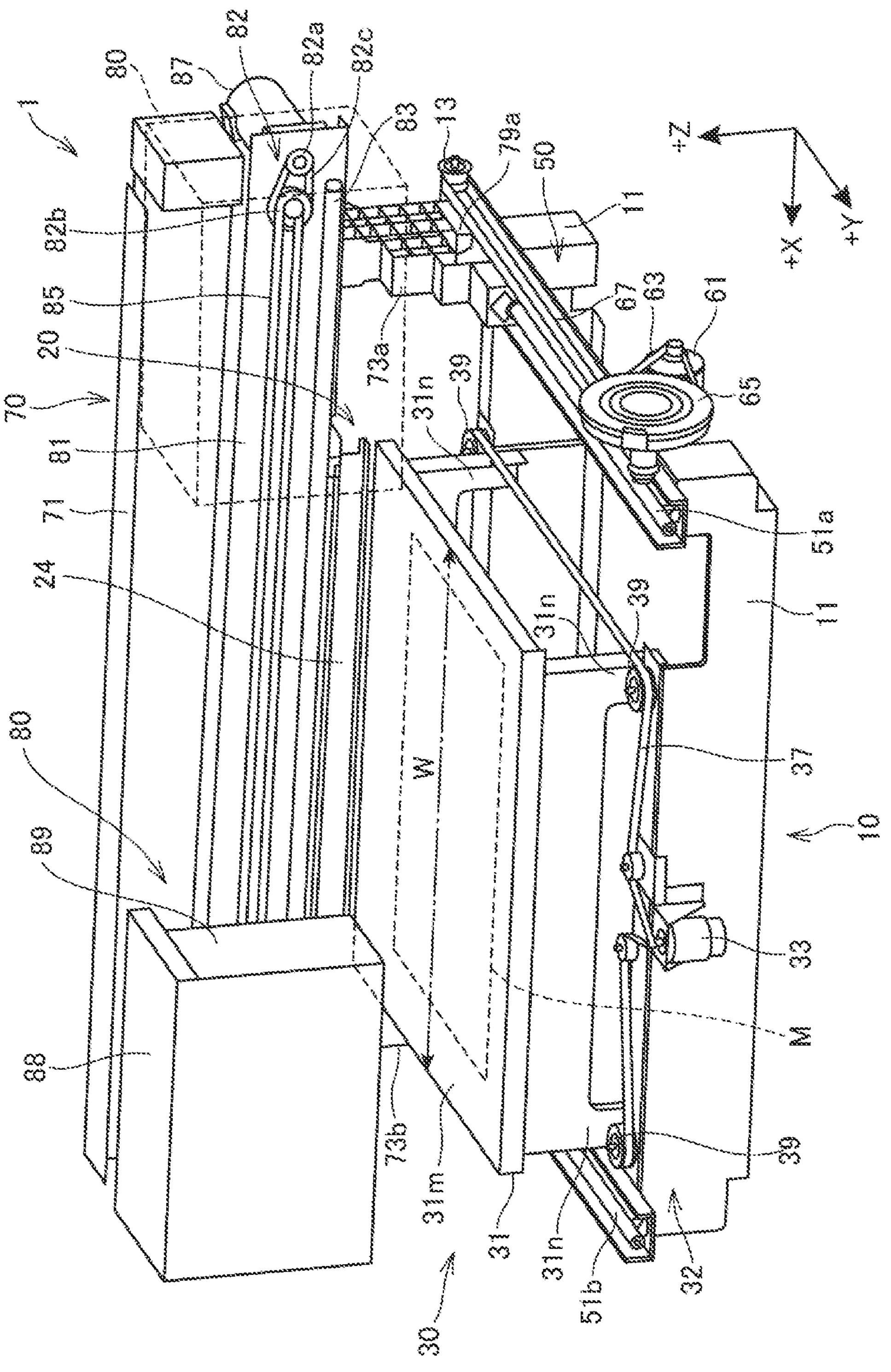
FIG. 1 is a perspective view of a recording device according to an exemplary embodiment.

FIG. 1 is a perspective view of the recording device 1.

The recording device 1 illustrated in FIG. 1 is a device for recording on a medium M by a recording head 89 discharging liquid onto the medium M. The medium M is a sheet, cloth, or a three-dimensional object. The sheet may be paper, or a sheet made of a synthetic resin. The cloth may be any of a non-woven fabric, a knit, and fabric. Examples of the three-dimensional object include accessories such as clothes and shoes, daily necessities, machine parts, and various other objects. Types of the liquid that the recording device 1 discharges onto the medium M are not limited, and only need to have fluidity. For example, the recording device 1 is a printer that jets ink of one or more colors toward a surface of the medium M by the recording head 89, and forms an image on the medium M. In this case, the medium M corresponds to a printing medium.

FIG. 1 illustrates an X-axis, a Y-axis, and a Z-axis. The X-axis, the Y-axis, and the Z-axis are mutually orthogonal. The Z-axis is an axis extending in an up-down direction, and can be referred to as an axis extending in a vertical direction. The X-axis, and the Y-axis are parallel to a horizontal plane. In the following description, a direction along the X-axis is referred to as a left-right direction, and a direction along the Y-axis is referred to as a front-rear direction. Specifically, a positive direction along the −Z axis is referred to as an upward direction, a positive direction along the X-axis is referred to as a rightward direction, and a positive direction along the Y-axis is referred to as a forward direction. Each of the X-axis, the Y-axis, and the Z-axis in FIG. 1 indicates the same direction in each figure described below. The X-axis corresponds to a second axis, and the Y-axis corresponds to a first axis.

The recording device 1 includes a table 31 that supports the medium M. The table 31 is a seat that does not move in the X-axis direction and the Y-axis direction. An upper surface of the table 31 is referred to as a medium support portion 31*m*. The medium support portion 31*m* is a flat surface on which the medium M can be placed. A shape and a size of the medium M are not limited, as far as the medium M does not protrude from the medium support portion 31*m*. Additionally, an end of the medium M may protrude from the medium support portion 31*m*. A height of the medium M corresponds to a size in a +Z direction of the medium M. The height of the medium M can be any size within a range where the table 31 can be lifted and lowered as described below.

The recording device 1 supports the medium M so as not to move, by the medium support portion 31*m*, and causes the recording head 89 to perform scanning above the medium M supported by the medium support portion 31*m*, and discharges liquid from the recording head 89 onto the medium M.

The recording device 1 includes a main body 10, and a movement unit 70. The main body 10 is a seat fixed to an installation surface of the recording device 1. The movement unit 70 moves along the Y-axis relative to the main body 10.

The main body 10 includes a base portion 11, a medium support mechanism 30, and a drive mechanism 50. The base portion 11 is fixed to the installation surface of the recording device 1, and supports each unit of the recording device 1. FIG. 1 illustrates an example in which a pair of the rod-shaped base portions 11 are disposed side by side along the Y-axis.

The medium support mechanism 30 includes the table 31, and a height movement mechanism 32. The table 31 includes a rectangular flat plate, and four table leg portions 31*n* disposed at four corners of the flat plate, respectively, and an upper surface of the flat plate is the medium support portion 31*m* described above.

The height movement mechanism 32 includes a lifting/lowering motor 33, a lifting/lowering belt 37, and a lifting/lowering mechanism 39, and moves the medium support portion 31*m* in a direction along the Z-axis. The lifting/lowering mechanism 39 is provided at each of the four table leg portions 31*n*. The lifting/lowering mechanism 39 includes a ball screw, a nut that is screwed into the ball screw, and a pulley, that are disposed along the Z-axis. The ball screw of the lifting/lowering mechanism 39 is rotatably supported by the base portion 11. The nut of the lifting/lowering mechanism 39 is fixed to the table leg portion 31*n*. The pulley of the lifting/lowering mechanism 39 is fixed to a top of the ball screw. When the pulley of the lifting/lowering mechanism 39 rotates, the ball screw rotates, and the table leg portion 31*n* moves along the Z-axis together with the nut in association with the rotation of the ball screw.

The lifting/lowering motor 33 is a motor that rotates according to control of a control unit 90 described later. The control unit 90 controls a rotation direction and an amount of rotation of the lifting/lowering motor 33. The lifting/lowering belt 37 is an annular belt that is wound around an output shaft of the lifting/lowering motor 33 and the pulleys of the respective four lifting/lowering mechanisms 39. The lifting/lowering motor 37 is driven to circulate by the lifting/lowering motor 33 rotating. The lifting/lowering belt 37 transmits the rotation of the lifting/lowering motor 33 to the pulleys of the respective four lifting/lowering mechanisms 39. Accordingly, the ball screw of the lifting/lowering mechanism 39 rotates, and moves the table 31 along the Z-axis.

The rotation direction of the lifting/lowering motor 33 can be switched between a positive direction in which the table 31 is moved upward, and a reverse direction in which the table 31 is moved downward. The recording device 1 lifts and lowers the table 31 by operating the lifting/lowering motor 33.

The drive mechanism 50 includes a first guide shaft 51*a*, a second guide shaft 51*b*, and a frame drive unit 60. The first guide shaft 51*a* and the second guide shaft 51*b* are hung on the pair of base portions 11 and disposed along the Y-axis. The first guide shaft 51*a* is fixed to an end portion on a left side of each of the base portions 11, and the second guide shaft 51*b* is fixed to an end portion on a right side of each of the base portions 11.

The movement unit 70 includes a main frame 71, a first leg portion 73*a*, a second leg portion 73*b*, and a recording unit 80.

The main frame 71 is a plate member elongated in a direction along the X-axis. A size in the left-right direction of the main frame 71 is greater than that of the base portion 11. The first leg portion 73*a* fits into the first guide shaft 51*a*, and is movable along the first guide shaft 51*a*. The second leg portion 73*b* fits into the second guide shaft 51*b*, and is movable along the second guide shaft 51*b*. The main frame 71 is fixed over the first leg portion 73*a*, and the second leg portion 73*b*, and is supported from below by the first leg portion 73*a* and the second leg portion 73*b*. The first leg portion 73*a* is located at a left end portion of the main frame 71, and the second leg portion 73*b* is located at a right end portion of the main frame 71. The main frame 71 is guided, together with the first leg portion 73*a* and the second leg portion 73*b*, by the first guide shaft 51*a* and the second guide shaft 51*b*, and moves along the Y-axis.

The frame drive unit 60 includes a frame movement motor 61, a transmission belt 63, a gearbox 65, and a transmission belt 67.

The frame movement motor 61 is a motor that rotates according to the control of the control unit 90 described below. The transmission belt 63 is an annular belt that is wound between an output shaft of the frame movement motor 61 and the gearbox 65, and transmits driving force of the frame movement motor 61 to the gearbox 65. The gearbox 65 includes a first pulley and a second pulley, the transmission belt 63 is wound around the first pulley, and the transmission belt 67 is wound around the second pulley. The gearbox 65 drives the transfer belt 67 by rotating the second pulley by the driving force transmitted from the transmission belt 63 to the first pulley. The gearbox 65 transmits the driving force of the frame movement motor 61 to the transmission belt 67 at a reduction ratio corresponding to a ratio of a diameter of the first pulley and a diameter of the second pulley.

The transmission belt 67 is an annular belt that is wound around the gearbox 65 and a pulley 13 disposed at an end portion in a −Y direction of the base portion 11. The pulley 13 is rotatably installed with respect to the base portion 11. The transmission belt 67 is disposed along the first guide shaft 51*a*. The first leg portion 73*a* is fixed to the transmission belt 67 via a belt coupling portion 79*a*. Thus, by the transmission belt 67 being driven to circulate, power for moving the first leg portion 73*a* along the Y-axis acts on the first leg portion 73*a*. Thus, the movement unit 70 moves along the Y-axis.

A rotation direction of the frame movement motor 61 can be switched between a positive direction in which the main frame 71 is moved in a +Y direction, and a reverse direction in which the main frame 71 is moved in the −Y direction. The recording device 1 moves the main frame 71 forward and backward by operating the frame movement motor 61.

The second leg portion 73*b* included in the movement unit 70 is guided by the second guide shaft 51*b*. Thus, the main frame 71 moves parallelly in the +Y direction and the −Y direction along the first guide shaft 51*a* and the second guide shaft 51*b*. The +Y direction corresponds to a first direction, and the −Y direction corresponds to a second direction.

A carriage support frame 81, a transmission mechanism 82, a carriage guide shaft 83, and a carriage drive motor 87 are installed at the main frame 71. The recording unit 80 includes a carriage 88, and the recording head 89.

The carriage support frame 81 is a plate member elongated in the direction along the X-axis. The carriage guide shaft 83 is fixed to the carriage support frame 81 along the X-axis. The carriage 88 is supported by the carriage support frame 81 and the carriage guide shaft 83, and is movable along the carriage guide shaft 83. In a range where the carriage 88 moves along the X-axis, a position of a left end is determined as a home position. A mechanism for performing maintenance such as flushing or cleaning of the recording head 89 is disposed at the home position. In FIG. 1, the home position of carriage 88 is indicated by dashed lines.

The carriage drive belt 85 is an annular belt that is wound around the transmission mechanism 82 disposed at a left end portion of the carriage support frame 81, and a pulley (not illustrated) disposed at a right end portion of the carriage support frame 81. The carriage drive belt 85 is disposed along the carriage guide shaft 83.

The carriage drive motor 87 is a motor that rotates according to the control of the control unit 90 described below. The transmission mechanism 82 includes a pulley 82*a*, a two-stage pulley 82*b*, and a belt 82*c*. The pulley 82*a* is fixed to an output shaft of the carriage drive motor 87. The belt 82*c* is an annular belt that is wound around the pulley 82*a* and the two-stage pulley 82*b*. The two-stage pulley 82*b* includes a small pulley, and a large pulley with a diameter greater than that of the small pulley. The belt 82*c* is wound around the large pulley, and the carriage drive belt 85 is wound around the small pulley. The belt 82*c* is driven to circulate in accordance with the rotation of the carriage drive motor 87 to rotate the large pulley of the two-stage pulley 82*b*. The small pulley of the two-stage pulley 82*b* rotates together with the large pulley to drive the carriage drive belt 85 to circulate. In this manner, the rotation of the carriage drive motor 87 is transmitted to the carriage drive belt 85 at a reduction ratio corresponding to a ratio of a diameter of the large pulley and a diameter of the small pulley in the two-stage pulley 82*b*.

The carriage 88 is linked to the carriage drive belt 85. Thus, when the carriage drive belt 85 is driven to circulate, the carriage 88 moves along the X-axis. The carriage 88 is mounted with the recording head 89. By the carriage 88 moving along the X-axis, the recording head 89 moves in the left-right direction, that is, in a +X direction and a −X direction. Additionally, by the main frame 71 moving along the Y-axis, the recording head 89 moves in the front-rear direction, that is, in the +Y direction and the −Y direction. Therefore, the recording device 1 can move the recording head 89 in the front-rear direction and the left-right direction with respect to the table 31. Therefore, liquid such as ink can be discharged onto the entire medium M supported by the table 31.

The recording head 89 includes a plurality of nozzles (not illustrated) that discharge the liquid. These nozzles open at a lower end surface of the recording head 89. When the recording head 89 discharges the liquid from the nozzles, the discharged liquid flies between the lower end surface of the recording head 89, and the medium M placed on the table 31, and lands onto the medium M. A distance between a lower end of the recording head 89 and the medium M is referred to as a recording gap. The recording device 1 has a function of adjusting a size of the recording gap in order to perform recording on the medium M with high quality. Specifically, the recording device 1 operates the lifting/lowering motor 33 to lift or lower the table 31, so that the recording gap is adjusted to be an appropriate size.

The recording device 1 includes a height detector 20. The height detector 20 detects a height of the medium M placed on the table 31. The height of the medium M refers to a position of an upper end of the medium M in the direction along the Z-axis. The height detector 20 corresponds to an example of a detector.

The height detector 20 includes a contact plate 24 disposed protruding downward from a lower end of the main frame 71. The contact plate 24 is a plate member elongated in a direction along the X-axis, and as described below, attached so as to be displaced with respect to the main frame 71. The height detector 20 detects a displacement of the contact plate 24. The contact plate 24 corresponds to an example of a contact portion.

The recording device 1 determines that a relative position of the medium support portion 31*m* with respect to the main frame 71 is high on the Z-axis, when the contact plate 24 is detected to be in contact with the medium M and displaced, while the movement unit 70 moves forward or backward. In this case, the recording device 1 lowers the medium support portion 31*m* by the height movement mechanism 32. This allows the relative position of the medium M with respect to the recording head 89 on the Z-axis to be adjusted, and the recording gap can be adjusted to be an appropriate size.

In the X-axis, a position of the contact plate 24 overlaps the medium support portion 31*m*. That is, a range W in which the medium support portion 31*m* is located in the X-axis, and the contact plate 24 overlap. Thus, the contact plate 24 can be used to detect the relative position with respect to the recording head 89, for the entire medium M placed on the medium support portion 31*m*.

2. Configuration of Height Detector

Figure 2:
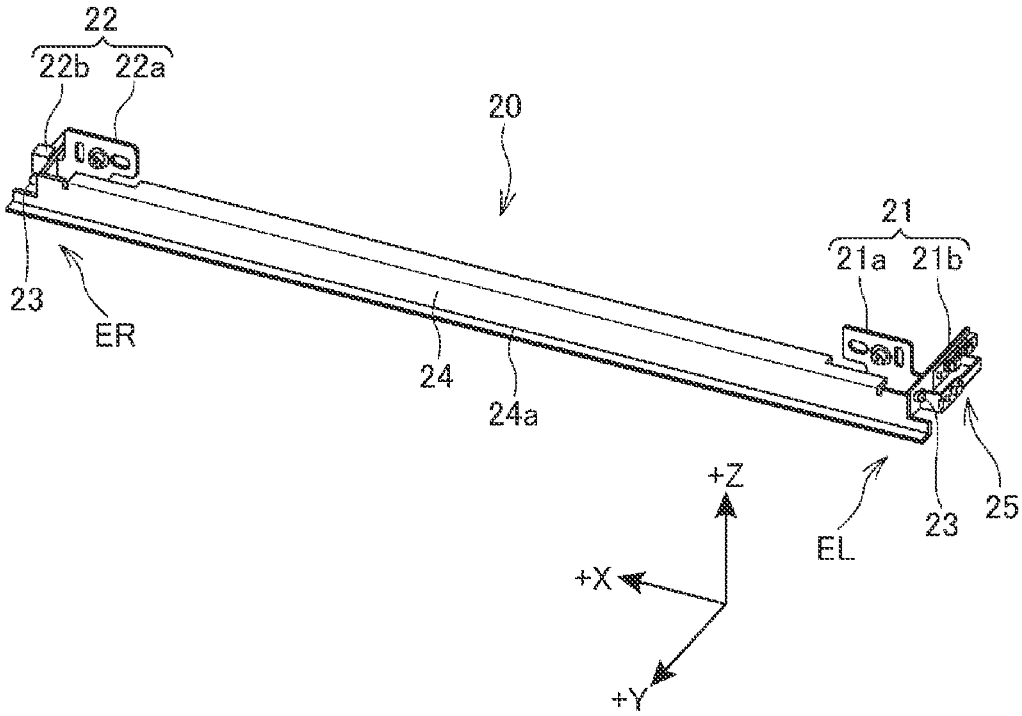
FIG. 2 is a perspective view of a height detector.
Figure 3:
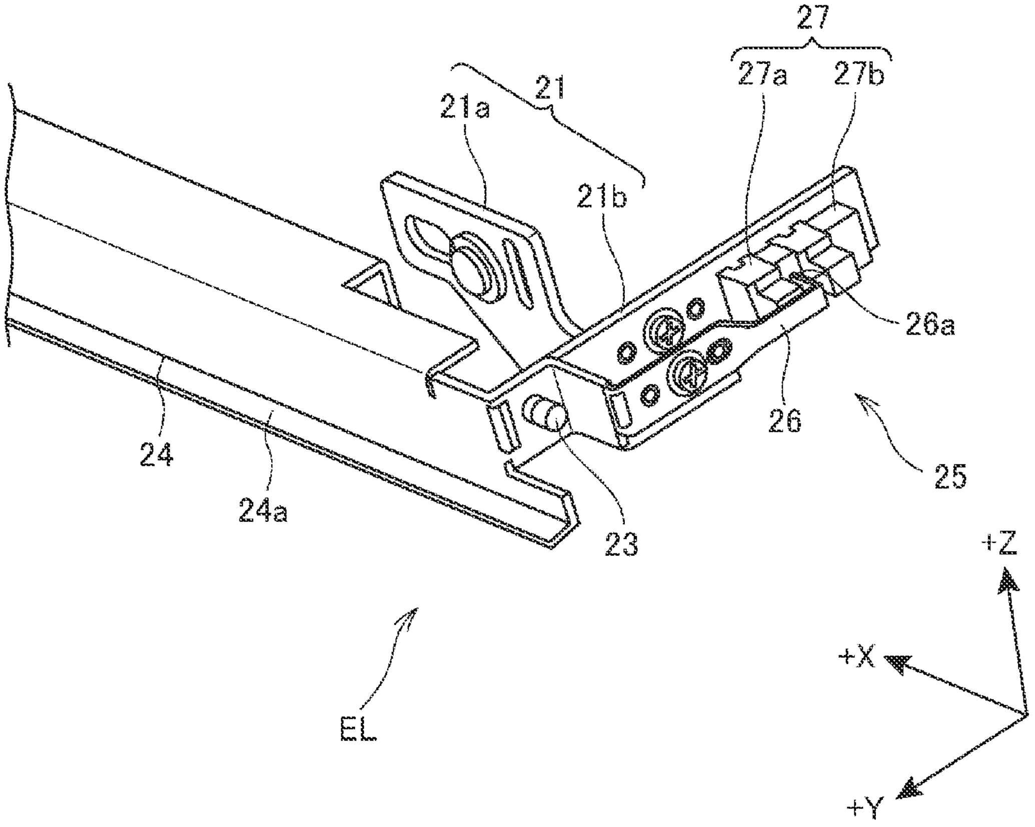
FIG. 3 is an enlarged perspective view of a main part of the height detector.
Figure 4:
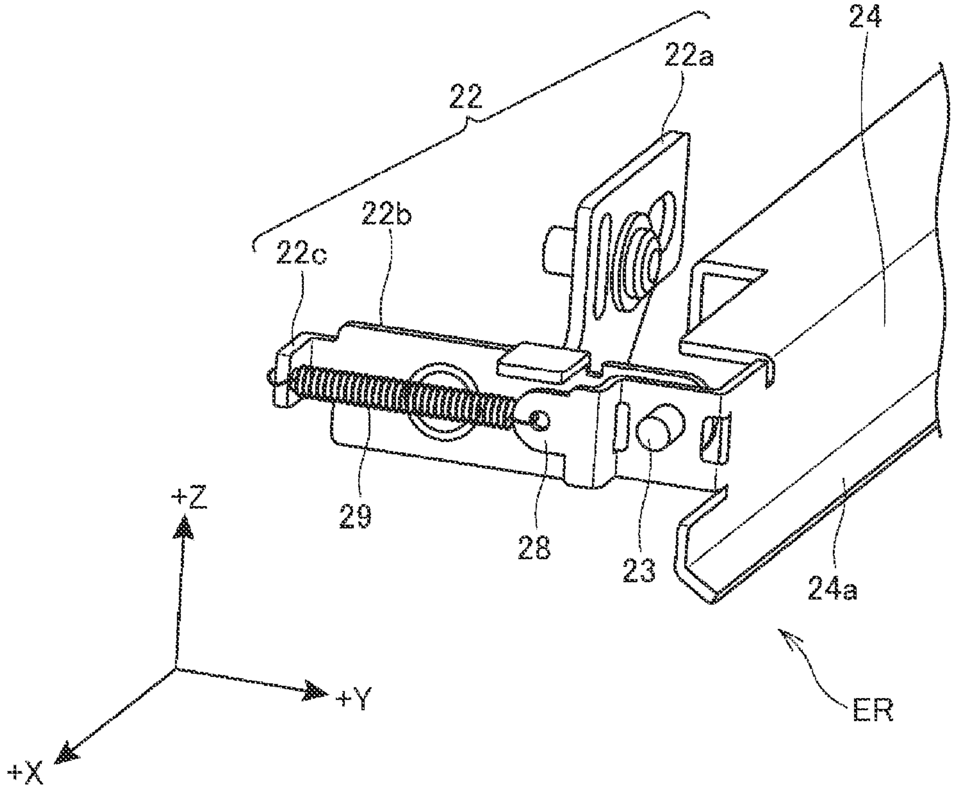
FIG. 4 is an enlarged perspective view of a main part of the height detector.
Figure 5:
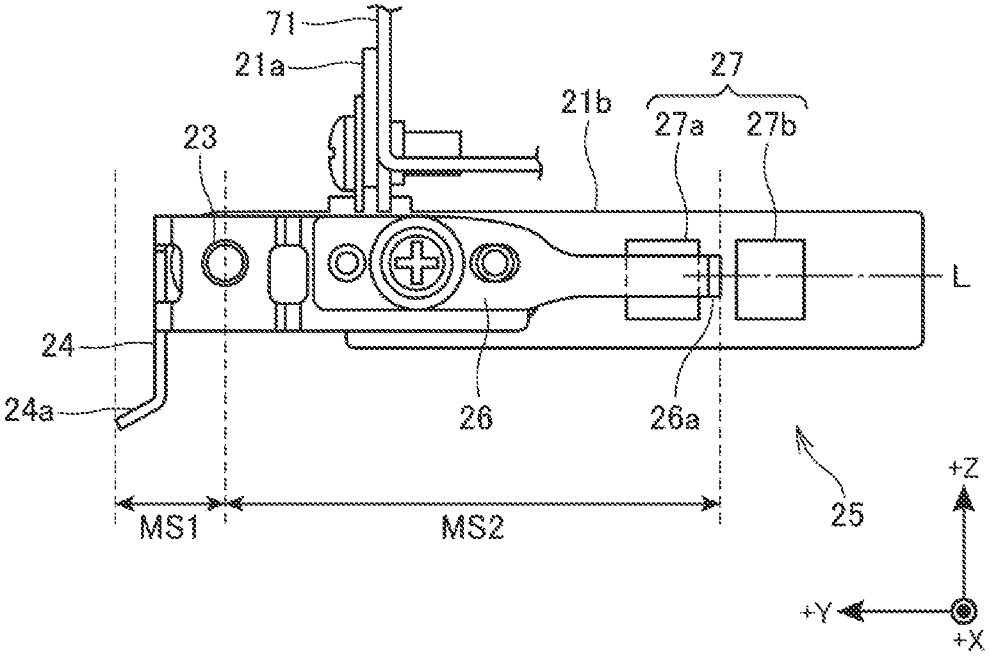
FIG. 5 is a side view of the height detector.

FIG. 2 is a perspective view of the height detector 20. FIG. 3 is an enlarged perspective view of a main part of the height detector 20, and illustrates an enlarged right end portion ER of the height detector 20. FIG. 4 is an enlarged perspective view of a main part of the height detector 20, and illustrates an enlarged left end portion EL of the height detector 20. FIG. 5 is a side view of the height detector 20.

The height detector 20 includes a support portion 21, a support portion 22, a rotational movement shaft 23, the contact plate 24, and a displacement detector 25. The support portion 21 supports the contact plate 24 at the left end portion EL of the height detector 20. The support portion 22 supports the contact plate 24 at the right end portion ER of the height detector 20.

The support portion 21 includes a bracket 21*a* and a coupling portion 21*b*. The bracket 21*a* is fixed to a lower end portion of the main frame 71. The coupling portion 21*b* is a plate-like portion extending in the −Y direction from the bracket 21*a*. A left end portion of the contact plate 24 is attached to the coupling portion 21*b* by the rotational movement shaft 23.

The support portion 22 includes a bracket 22*a*, a coupling portion 22*b*, and a protrusion 22*c*. The bracket 22*a* is fixed to a lower end of the main frame 71. The coupling portion 22*b* is a plate-like portion extending from the bracket 22*a* in the −Y direction. A right end portion of the contact plate 24 is attached to the coupling portion 22*b* by the rotational movement shaft 23. The protrusion 22*c* is a protrusion provided at a rear end portion of the coupling portion 22*b*.

At the left end portion EL, the rotational movement shaft 23 supports the contact plate 24 so as to be rotatable with respect to the coupling portion 21*b*. Similarly at the right end portion ER, the rotational movement shaft 23 supports the contact plate 24 so as to be rotatable with respect to the coupling portion 22*b*. Thus, the contact plate 24 is attached to the main frame 71 so as to be rotatable in the pair of rotational movement shafts 23. A lower end portion of the contact plate 24 is bent in the +Y direction. This portion is referred to as a contact portion 24*a*.

The displacement detector 25 is provided at the left end portion EL of the height detector 20. The displacement detector 25 includes an arm 26 and a displacement sensor 27. The arm 26 is a member coupled to the contact plate 24, and extending from the contact plate 24 in the −Y direction. The arm 26 may be integral with the contact plate 24. In other words, the height detector 20 is configured to include the arm 26, and the contact plate 24 fixed or coupled to one end of the arm 26. The arm 26 corresponds to an example of an arm portion. The displacement sensor 27 corresponds to an example of the displacement detector.

The displacement sensor 27 is a sensor attached to the coupling portion 21*b*. An arm tip portion 26*a*, which is a tip of the arm 26, is bent toward the displacement sensor 27.

When the contact plate 24 contacts the medium M or the table 31 while the main frame 71 moves forward or backward, the contact plate 24 rotates about the rotational movement shaft 23. At this time, the arm 26 is displaced with the rotation of the contact plate 24. The displacement sensor 27 detects a displacement of the arm 26.

In FIG. 3 and FIG. 4, a state is illustrated in which the contact plate 24 does not contact any of the medium M and the table 31. This state is referred to as a normal state. A position of the contact plate 24 and the arm 26 in the normal state is a non-contact position.

As illustrated in FIG. 4, in the right end portion ER, a spring support portion 28 is provided at the contact plate 24. The spring support portion 28 is a member coupled to the contact plate 24 and extending in the −Y direction from the contact plate 24. The spring support portion 28 may be integral with the contact plate 24. A hole is provided in the spring support portion 28, and a spring 29 is disposed between the hole and the protrusion 22*c*. The spring 29 is a tension coil spring that imparts tension to the spring support portion 28 toward the protrusion 22*c*. The spring 29 corresponds to an example of a biasing member.

The spring 29 is an example of an elastic member that imparts tension to the spring support portion 28 toward a back of the recording device 1. It is also possible to replace the spring 29 by an elastic member such as rubber.

The spring 29 imparts tension to the spring support portion 28 so as to approach the protrusion 22*c*. When the contact plate 24 is in the normal state of not contacting the medium M and the table 31, and is at the non-contact position, the spring support portion 28 is closest to the protrusion 22*c*. When the contact plate 24 rotates from the non-contact position, the tension of the spring 29 acts in a direction for returning the contact plate 24 to the normal state. In this manner, the spring 29 has the action of maintaining the contact plate 24 at the non-contact position, and the action of returning the contact plate 24 to the non-contact position when the contact plate 24 rotates.

The displacement sensor 27 only needs to be a sensor capable of detecting that the arm 26 is displaced from the non-contact position. Examples of the displacement sensor 27 include, for example, a magnetic sensor, a reflective type optical sensor, and a transmission type optical sensor.

As illustrated in FIG. 3 and FIG. 5, in the present exemplary embodiment, an example in which the displacement sensor 27 is constituted by a transmission type optical sensor is illustrated. The displacement sensor 27 includes a light-emitting unit 27*a*, and a light-receiving unit 27*b*. The light-emitting unit 27*a* includes a light source such as an LED (Light Emitting Diode), and emits light toward the light-receiving unit 27*b*. The light-receiving unit 27*b* includes a photoreceptor element, receives light emitted by the light-emitting unit 27*a*, and outputs a detection value corresponding to a received light amount. FIG. 5 illustrates a path of the light emitted by the light-emitting unit 27*a* with a reference sign L.

A space through which the arm tip portion 26*a* can enter and exit is provided between the light-emitting unit 27*a* and the light-receiving unit 27*b*. At the non-contact position, the arm tip portion 26*a* is located between the light-emitting unit 27*a* and the light-receiving unit 27*b*, and blocks the light path L. When the contact plate 24 contacts the medium M or the table 31 and rotates, for example, the arm 26 rotates with the contact plate 24. Then, when the arm 26 rotates, and the arm tip portion 26*a* deviates from the light path L, a light amount received by the light-receiving unit 27*b* increases.

The contact plate 24, the arm 26, and the spring support portion 28 integrally gather about the rotational movement shaft 23. In a direction along the Y-axis, weight of the contact plate 24, the arm 26, and the spring support portion 28 may be adjusted such that the contact plate 24, the arm 26, and the spring support portion 28 are horizontal in the normal state. Specifically, as illustrated in FIG. 5, mass of a portion MS1 in the +Y direction from a center of the rotational movement shaft 23, and mass of a portion MS2 in the −Y direction from the center of the rotational movement shaft 23 may be substantially the same. In this case, when the contact plate 24 does not contact any of the medium M and the table 31, there is an advantage that the contact plate 24 and the arm 26 are stable at the non-contact position. Furthermore, when the contact plate 24 contacts either the medium M and the table 31, there is an advantage that the contact plate 24 rotates easily with the arm 26 from the non-contact position.

3. Operation of Height Detector

Figure 6:
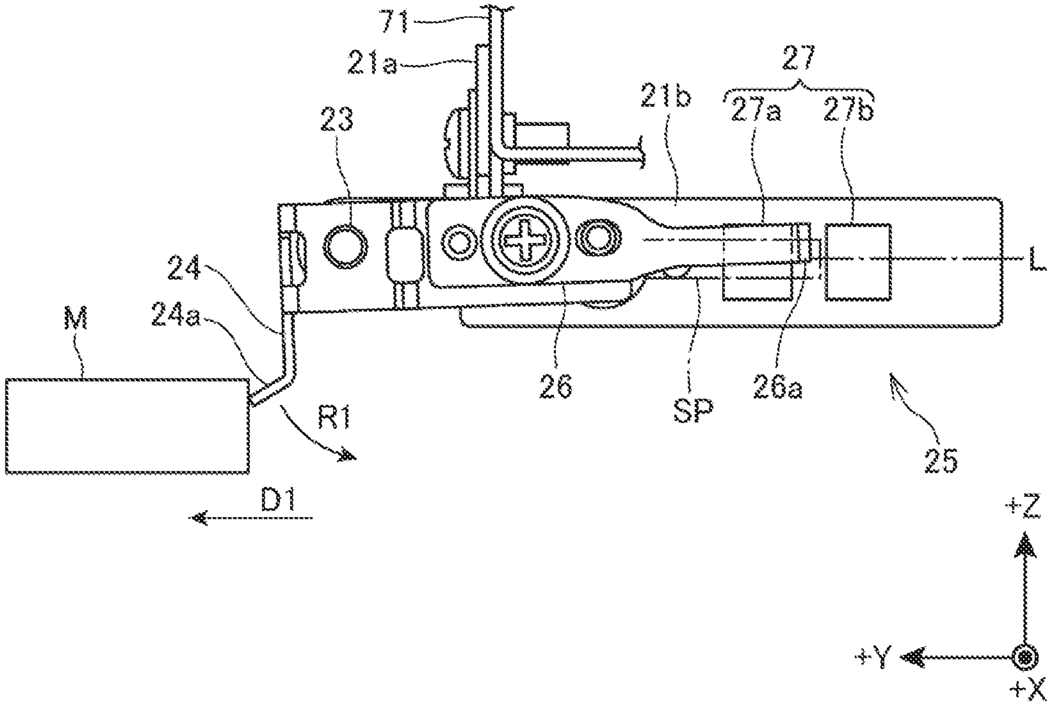
FIG. 6 is an explanatory diagram of a detection state of the height detector.
Figure 7:
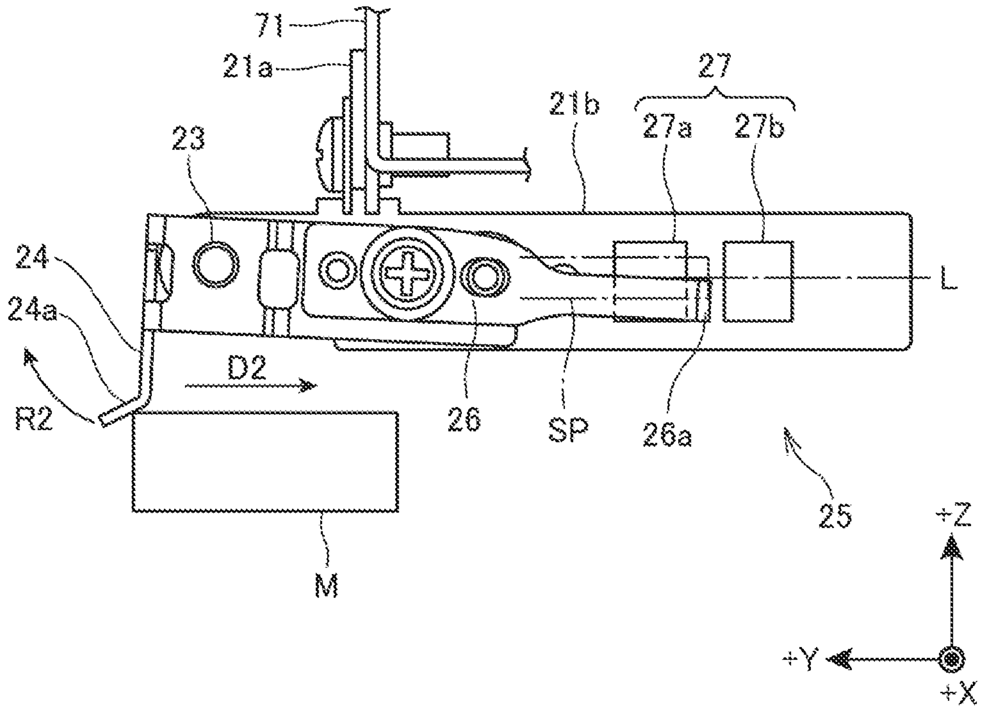
FIG. 7 is an explanatory diagram of the detection state of the height detector.
Figure 8:
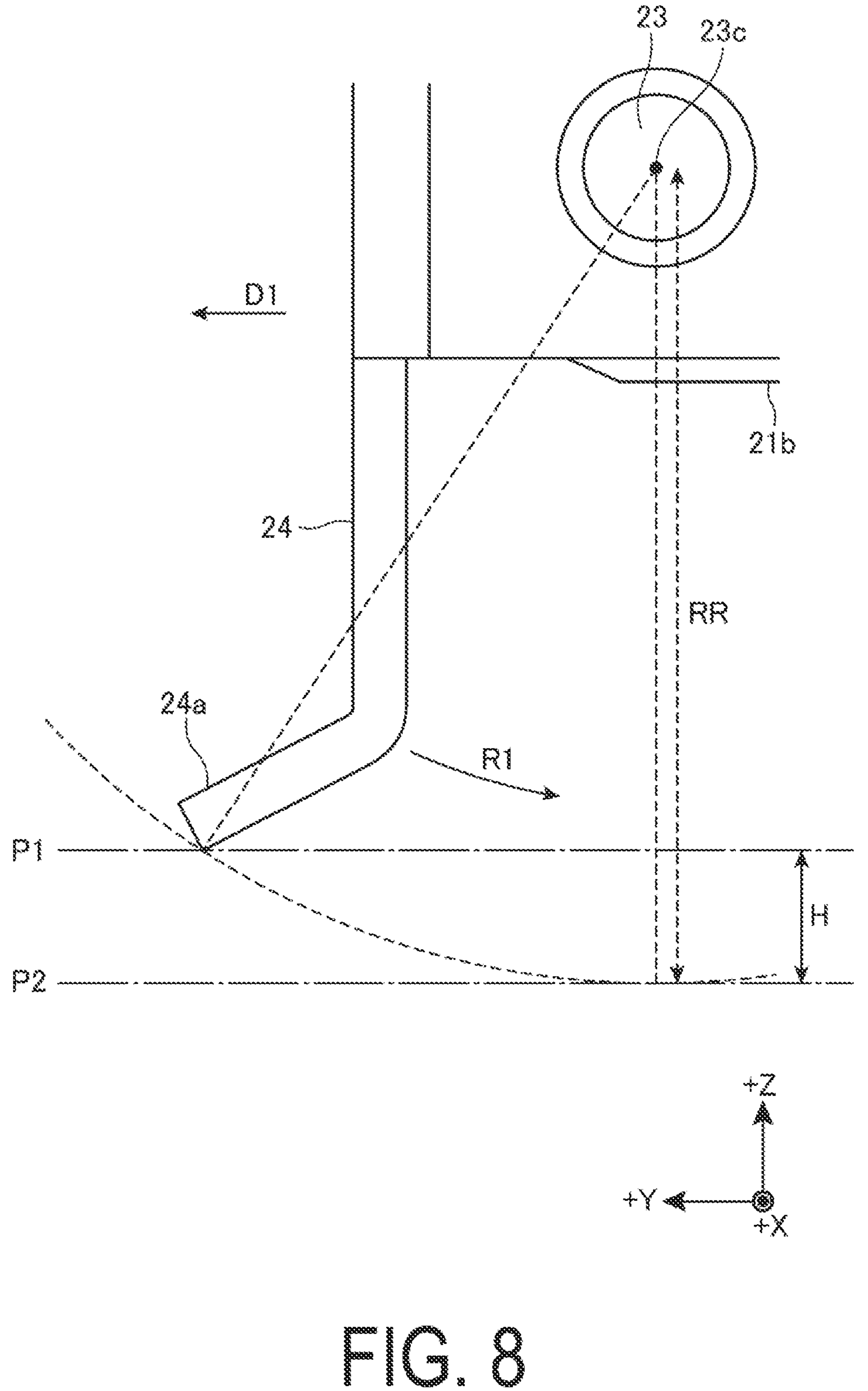
FIG. 8 is an explanatory diagram illustrating movement of a contact plate in the detection state of the height detector.

FIG. 6, and FIG. 7 are explanatory diagrams of a detection state of the height detector 20. FIG. 8 is an explanatory diagram illustrating movement of the contact plate in the detection state of the height detector 20.

FIG. 6 and FIG. 7 illustrate a state when the contact plate 24 contacts the medium M while the movement unit 70 moves. FIG. 6 illustrates a movement direction of the movement unit 70 with a reference sign D1. The D1 direction corresponds to the +Y direction. FIG. 7 illustrates the movement direction of the movement unit 70 with a reference sign D2. The D2 direction corresponds to the −Y direction.

In the state illustrated in FIG. 6, the contact portion 24*a* contacts the medium M from behind the medium M. When the movement unit 70 moves in the D1 direction from the state of FIG. 6, the contact portion 24*a* contacts the medium M, and thus the contact plate 24 rotates in a direction indicated by a reference sign R1 about the rotational movement shaft 23. The direction R1 faces a downside and a back of the contact plate 24.

In the state illustrated in FIG. 7, the contact portion 24*a* contacts the medium M from a front of the medium M. When the movement unit 70 moves in the D2 direction from the state of FIG. 7, the contact portion 24*a* contacts the medium M, and thus the contact plate 24 rotates in a direction indicated by a reference sign R2 about the rotational movement shaft 23. The direction R2 faces an upside and a front of the contact plate 24.

In both the state illustrated in FIG. 6 and the state illustrated in FIG. 7, the movement unit 70 continues to move, thereby displacing the arm 26 and deviating from the light path L. Thus the displacement sensor 27 can detect that the contact plate 24 rotates.

As illustrated in FIG. 6, when the contact plate 24 contacts the medium M while the movement unit 70 moves in the D1 direction, the contact portion 24*a* descends along with the rotation of the contact plate 24. This lowering amount will be described with reference to FIG. 8.

FIG. 8 illustrates a shaft center of the rotational movement shaft 23 as a center of rotation 23*c*. The center of rotation 23*c* is a center of the rotation of the contact plate 24. Positions of a lower end of the contact portion 24*a* in the Z-axis direction are indicated as positions P1 and P2. The position P1 is a position of the contact portion 24*a* in the normal state, and is the non-contact position. The position P2 is a lowest position in a rotational range of the contact portion 24*a*. A difference between the position P1 and the position P2 is a height H. A size of the height H is determined corresponding to a rotational radius of a tip of the contact portion 24*a* indicated by a reference sign RR in FIG. 8.

When the contact portion 24*a* contacts the medium M or the table 31 while the movement unit 70 moves in the D1 direction, the contact portion 24*a* lowers by the height H. Thus, when the contact portion 24*a* and the table 31 are in close proximity, by the contact portion 24*a* rotating, the contact portion 24*a* may contact the table 31 or the medium M. From this state, when the movement unit 70 further moves in the D1 direction, the contact portion 24*a* may be caught on an upper surface of the table 31 or the medium M. Thus, as described below, when the movement unit 70 moves in the D1 direction, the recording device 1 ensures a gap that is the same as or greater than the height H between the contact portion 24*a* and the table 31. As a result, it is possible to avoid the situation where the contact portion 24*a* is caught on the upper surface of the table 31 or the medium M.

4. Configuration of Control System of Recording Device

Figure 9:
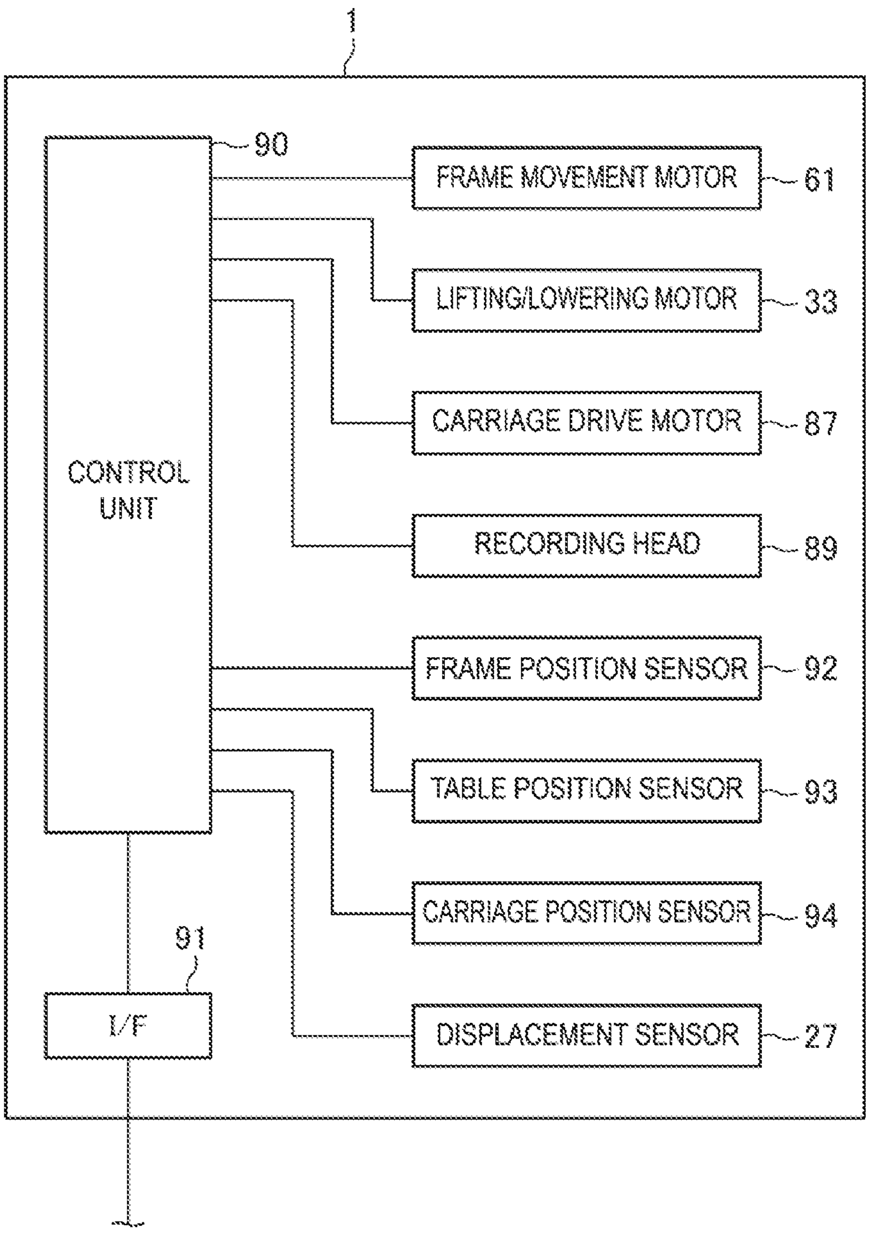
FIG. 9 is a block diagram of the recording device.

FIG. 9 is a block diagram of the recording device 1, and illustrates a functional configuration of a control system of the recording device 1.

The recording device 1 includes the control unit 90. The control unit 90 includes a processor such as a CPU (Central Processing Unit) or an MPU (Micro Processing Unit), and a storage unit. The storage unit of the control unit 90 includes a volatile memory, and a non-volatile storage unit. The volatile memory is, for example, a RAM (Random Access Memory). The non-volatile storage unit includes a ROM (Read Only Memory), a hard disk, a flash memory, and the like. The control unit 90 controls each unit of the recording device 1 by executing a program stored in the storage unit.

An interface (I/F) 91 is coupled to the control unit 90. The interface 91 is a communication device that performs wired communication that utilizes cables, or performs wireless communication that utilizes wireless communication lines. The interface 91 communicates with a host computer (not illustrated) to receive recorded data. The recorded data includes data of images or characters that the recorded data 1 records on the medium M, commands for instructing the recording device 1 to perform recording, and other data.

The lifting/lowering motor 33, the frame movement motor 61, the carriage drive motor 87, and the recording head 89 are coupled to the control unit 90. A frame position sensor 92, a table position sensor 93, a carriage position sensor 94, and a displacement sensor 27 are coupled to the control unit 90.

The frame position sensor 92 is a sensor that detects a position of the main frame 71 in the Y-axis. For example, the frame position sensor 92 is a linear encoder disposed along the first guide shaft 51*a*. The table position sensor 93 is a sensor that detects a position of the table 31 in the Z-axis. The table position sensor 93 is, for example, a rotary encoder that detects an amount of rotation of the lifting/lowering motor 33, or a rotary encoder that detects an amount of rotation of the ball screw of the lifting/lowering mechanism 39. The carriage position sensor 94 is a sensor that detects a position of the carriage 88 in the X-axis. For example, the carriage position sensor 94 is a linear encoder disposed along the carriage guide shaft 83. The control unit 90 specifies the position of the main frame 71, the position of the table 31, and the position of the carriage 88, based on detection values of the frame position sensor 92, the table position sensor 93, and the carriage position sensor 94.

The control unit 90 operates each motor based on the recorded data received by the interface 91. Specifically, the control unit 90 controls switching of the rotational direction of the frame movement motor 61, starting and stopping of the rotation of the frame movement motor 61, to move the movement unit 70 along the Y-axis. The control unit 90 controls switching of the rotational direction of the lifting/lowering motor 33, starting and stopping of the rotation of the lifting/lowering motor 33, to move the table 31 along the Z-axis. The control unit 90 controls switching of the carriage drive motor 87, starting and stopping of the rotation of the carriage drive motor 87, to move the carriage 88 along the X-axis. In the control described above, the control unit 90 utilizes the detection values of the frame position sensor 92, the table position sensor 93, and the carriage position sensor 94.

The control unit 90, based on the recorded data received by the interface 91, operates the recording head 89 to discharge liquid.

The control unit 90 adjusts the recording gap while the medium M is placed on the table 31. The control unit 90 operates the frame movement motor 61 to move the main frame 71 in the D1 direction or the D2 direction. The control unit 90 determines whether the contact plate 24 contacts the medium M or the table 31 or not by determining whether the arm 26 is displaced or not based on a detection value of the displacement sensor 27. When determining that the contact plate 24 contacts the medium M or the table 31, the control unit 90 operates the lifting/lowering motor 33 to lower the table 31.

5. Operation of Recording Device

Figure 10:
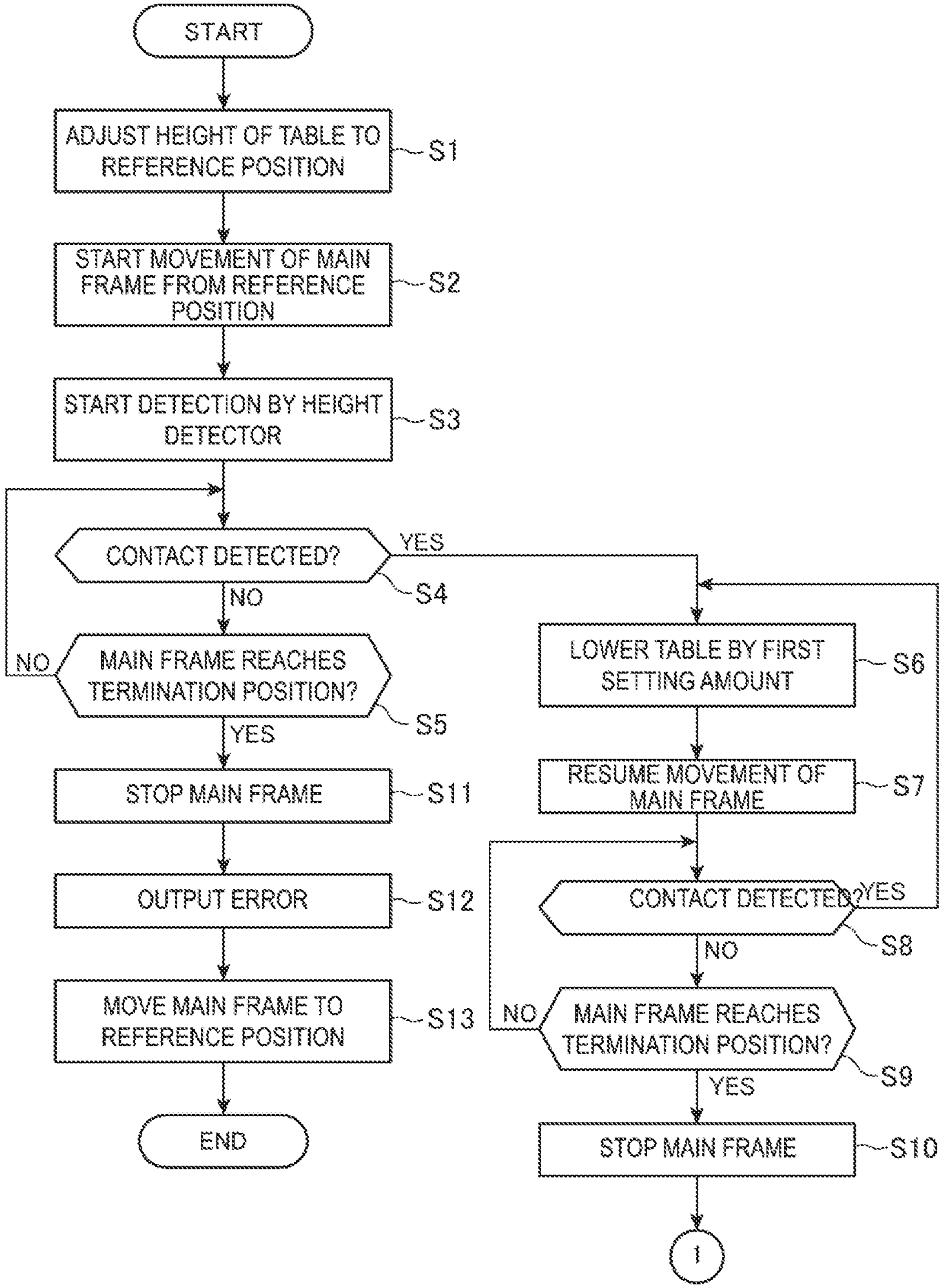
FIG. 10 is a flowchart illustrating operation of the recording device.
Figure 11:
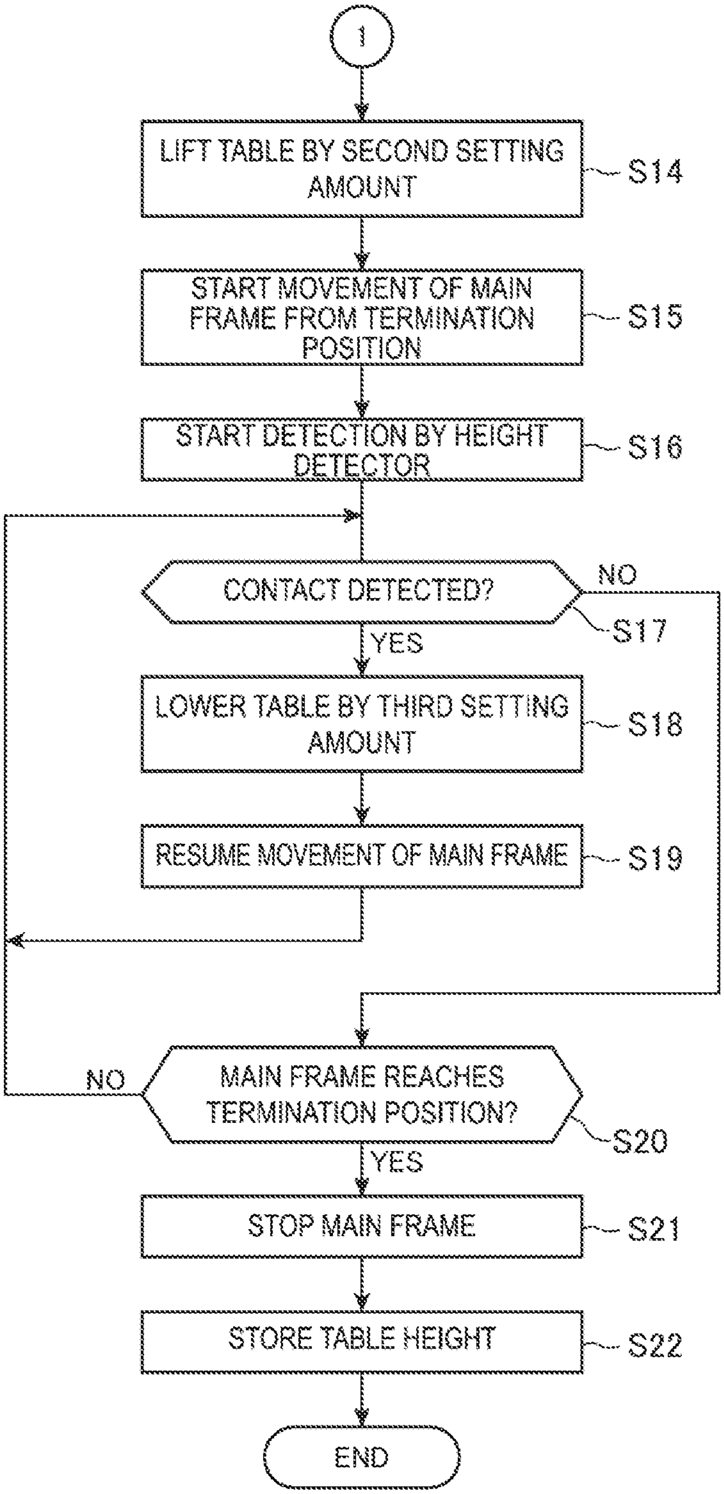
FIG. 11 is the flowchart illustrating the operation of the recording device.

FIG. 10 and FIG. 11 are a flowchart illustrating operation of the recording device 1, and illustrate operation of the recording device 1 for adjusting a recording gap.

In step S1, the control unit 90 adjusts a position of the table 31 to a reference position by operating the lifting/lowering motor 33 based on a detection value of the table position sensor 93. The reference position of the table 31 is a preset height, and for example, is a position in the Z-axis of the table 31 when the medium M is a sheet and an appropriate recording gap is ensured.

In step S2, the control unit 90 causes movement of the main frame 71 to start from a reference position of the main frame 71. The reference position of the main frame 71 is, for example, an end portion in the −Y direction in a movement range of the main frame 71. In this case, the control unit 90 causes movement of the main frame 71 to start in the +Y direction. In step S2, when the main frame 71 is not at the reference position, the control unit 90 may cause movement of the main frame 71 to start, after moving the main frame 71 to the reference position. While the main frame 71 moves, the carriage 88 is held at the home position.

In step S3, the control unit 90 starts detection by the height detector 20, along with the start of the movement of the main frame 71 in step S2. Specifically, the control unit 90 starts monitoring a detection value of the displacement sensor 27. The control unit 90 detects that the contact plate 24 contacts the medium M or the table 31, when the detection value of the displacement sensor 27 changes beyond a preset range.

In step S4, the control unit 90 determines whether contact of the contact plate 24 with the medium M or the table 31 is detected or not. When contact of the contact plate 24 is not detected (step S4; NO), the control unit 90 moves to step S5. In step S5, the control unit 90 determines whether the main frame 71 reaches a termination position or not, based on a detection value of the frame position sensor 92. The termination position is, for example, an end portion in the +Y direction in the movement range of the main frame 71. The reference position, and the termination position of the main frame 71 are preset, and stored in the storage unit of the control unit 90. When determining that the main frame 71 does not reach the termination position (step S5; NO), the control unit 90 returns to step S4. When determining that the main frame 71 reaches the termination position (step S5; YES), the control unit 90 moves to step S11, which will be described later.

In step S4, when contact of the contact plate 24 is detected (step S4; YES), the control unit 90 causes the movement of the main frame 71 to stop and moves to step S6. In step S6, the control unit 90 lowers the table 31 by setting a rotation direction of the lifting/lowering motor 33 to a reverse direction, and rotating the lifting/lowering motor 33. In step S6, a height by which the table 31 is lowered, that is, a lowering amount, is a preset first setting amount. The first setting amount is an amount, which is equal to or greater than the height H illustrated in FIG. 8, and is set based on the height H. In other words, the first setting amount is determined corresponding to the rotational radius RR of the tip of the contact portion 24*a*. The first setting amount corresponds to an example of a first change amount.

In step S7, the control unit 90 causes the movement of the main frame 71 to resume. Subsequently, in step S8, the control unit 90 determines whether contact of the contact plate 24 with the medium M or the table 31 is detected or not. When determining that contact of the contact plate 24 is detected (step S8, YES), the control unit 90 returns to step S6 and causes the movement of the main frame 71 to stop.

When contact of the contact plate 24 is not detected (step S8; NO), the control unit 90 moves to step S9. In step S9, the control unit 90 determines whether the main frame 71 reaches the termination position or not, based on a detection value of the frame position sensor 92. When determining that the main frame 71 does not reach the termination position (step S9, NO), the control unit 90 returns to step S8. When determining that the main frame 71 reaches the termination position (step S9; YES), the control unit 90 moves to step S10. In step S10, the control unit 90 causes the movement of the main frame 71 to stop, and moves to step S14 in FIG. 11.

On the other hand, in step S11, the control unit 90 causes the movement of the main frame 71 to stop. Subsequently, in step S12, the control unit 90 outputs an error. In step S12, for example, the control unit 90 outputs a signal indicating the error to the host computer coupled to the interface 91. In addition, when the recording device 1 includes a display, the control unit 90 causes the display to display characters and the like indicating the error in step S12.

In step S13, the control unit 90 moves the main frame 71 to the reference position, and ends the present processing.

In step S14, the control unit 90 sets the rotation direction of the lifting/lowering motor 33 to the positive direction, and rotates the lifting/lowering motor 33 to lift the table 31. In step S14, a height by which the table 31 is lifted, that is, a lifting amount is a preset second setting amount. The second setting amount is less than the height H illustrated in FIG. 8.

Subsequently, in step S15, the control unit 90 causes movement of the main frame 71 in the −Y direction to start from the termination position of the main frame 71. Further, in step S16, the control unit 90 starts detection by the height detector 20 along with the start of the movement of the main frame 71.

In step S17, the control unit 90 determines whether contact of the contact plate 24 with the medium M or the table 31 is detected or not. When contact of the contact plate 24 is not detected (step S17; NO), the control unit 90 moves to step S20 described below.

When contact of the contact plate 24 is detected (step S17; YES), the control unit 90 causes the movement of the main frame 71 to stop and moves to step S18. In step S18, the control unit 90 lowers the table 31 by setting the rotation direction of the lifting/lowering motor 33 to the reverse direction, and rotating the lifting/lowering motor 33. In step S18, a height by which the table 31 is lowered, that is, a lowering amount, is a preset third setting amount. The third setting amount is less than the first setting amount. The third setting amount corresponds to an example of a second change amount.

Next, the control unit 90 causes the movement of the main frame 71 to resume in step S19, and returns to step S17.

In step S20, the control unit 90 determines whether the main frame 71 reaches the termination position or not. When determining that the main frame 71 does not reach the termination position (step S20; NO), the control unit 90 returns to step S17. When determining that the main frame 71 reaches the termination position (step S20, YES), the control unit 90 moves to step S21. In step S21, the control unit 90 causes the movement of the main frame 71 to stop. Subsequently, in step S22, the control unit 90 causes a storage unit (not illustrated) to store a height of the table 31, and ends the present processing.

6. Effects by Exemplary Embodiment

As described above, the recording device 1 according to the exemplary embodiment of the present disclosure includes the medium support portion 31*m* that supports the medium M, the recording unit 80 that records on the medium M, and the movement unit 70 that moves relative to the medium support portion 31*m* along the first axis. The recording device 1 includes the height detector 20 attached to the movement unit 70. The height detector 20 includes the arm 26 that is rotatably coupled to the movement unit 70, and the contact plate 24 fixed to the one end of the arm 26, and the displacement sensor 27 that detects a displacement of the contact plate 24. The contact plate 24 is disposed at a position overlapping the medium support portion 31*m* in the second axis orthogonal to the first axis. The arm 26 is at the non-contact position along the first axis when the contact plate 24 does not contact the medium M, and rotates about the rotational movement shaft 23 by the contact plate 24 contacting the medium while the movement unit 70 moves. The displacement sensor 27 detects whether the arm 26 is at the non-contact position or not.

According to this configuration, it is possible to detect the height of the medium M by detecting whether the contact plate 24 contacts the medium M while the movement unit 70 is caused to move or not. Since the contact plate 24 is at a position overlapping the medium support portion 31*m* in the X-axis orthogonal to the movement direction of the movement unit 70, for example, it is not necessary to provide the height detector 20 at a position protruding from the movement unit 70 in the X-axis direction. Therefore, it is possible to detect the height of the medium M without providing a member protruding around the table 31.

The recording device 1 includes the biasing member that biases the arm 26 in a direction that does not deviate from the non-contact position. According to this configuration, since the arm 26 is held at the non-contact position, it is possible to suppress an event of erroneous detection of contact in a state where the contact plate 24 does not contact the medium M. Therefore, the height of the medium M can be detected more accurately.

In the recording device 1, the contact plate 24 is attached to a lower end of the movement unit 70, and a lower end of the contact plate 24 protrudes below the arm 26. According to this configuration, the height detector 20 can be disposed at the movement unit 70 without protruding from the movement unit 70 in the X-axis direction.

The recording device 1 includes the height movement mechanism 32 that changes a height of the medium support portion 31*m* relative to the movement unit 70, and the control unit 90 that operates the height movement mechanism 32. The movement unit 70 is movable in the first direction along the first axis, and in the second direction opposite to the first direction. When detecting that the arm 26 is not at the non-contact position while the movement unit 70 moves in the first direction or the second direction by the displacement sensor 27, the control unit 90 reduces the height of the medium support portion 31*m* by the height movement mechanism 32. The control unit 90 varies a change amount of the height of the medium support portion 31*m* depending on the movement direction of the movement unit 70 when detecting that the arm 26 is not at the non-contact position by the displacement sensor 27. For example, the control unit 90 lowers the table 31 by the first setting amount when the movement direction of the movement unit 70 is the +Y direction, and lowers the table 31 by the third setting amount when the movement direction of the movement unit 70 is the −Y direction. According to this configuration, when the contact plate 24 and the arm 26 rotate, an event due to movement of the contact plate 24 in a direction for approaching the table 31 can be avoided.

In the recording device 1, the rotational movement shaft 23 of the arm 26 is behind the contact plate 24 when the movement unit 70 moves in the first direction. The control unit 90 sets a change amount of the height of the medium support portion 31*m* when the movement direction of the movement unit 70 is the first direction to a first change amount, and sets a change amount of the height of the medium supporting portion 31*m* when the movement direction of the movement unit 70 is the second direction to a second change amount less than the first change amount. The first change amount corresponds to the first setting amount, and the second change amount corresponds to the third setting amount. In this configuration, when the movement unit 70 moves in the +Y direction, the contact plate 24 and the arm 26 rotate about the rotational movement shaft 23 located behind. Thus, while the contact plate 24 and the arm 26 lower with the rotation, the control unit 90 can lower the table 31 by the third setting amount, thereby avoiding an event in which the contact plate 24 contacts the upper surface of the table 31.

In the recording device 1, a difference between the first change amount and the second change amount is determined corresponding to a difference between a position of the contact plate 24 at the non-contact position, and a position of the contact plate 24 when the contact plate 24 descends along with the rotation of the arm 26. Specifically, the first setting amount is determined corresponding to the height H that is the difference between the position P1 and the position P2. Accordingly, when the contact plate 24 and the arm 26 rotate, an event due to movement of the contact plate 24 in a direction for approaching the table 31 can be more reliably avoided.

In the recording device 1, the difference between the first change amount and the second change amount is determined corresponding to a rotational radius when the contact plate 24 rotates about the rotational movement shaft 23 of the arm 26. Specifically, the first setting amount is determined corresponding to the rotational radius RR of the contact portion 24*a*. Accordingly, when the contact plate 24 and the arm 26 rotate, an event due to movement of the contact plate 24 in a direction for approaching the table 31 can be more reliably avoided.

The control unit 90 moves the movement unit 70 in the first direction or the second direction, and interrupts the movement of the movement unit 70 when detecting that the arm 26 is not at the non-contact position during the movement of the movement unit 70 by the displacement sensor 27. The control unit 90 reduces the height of the medium support portion 31*m* by the height movement mechanism, and then resumes the movement of the movement unit 70, and stores the height of the medium supporting portion 31*m* when the movement unit 70 completes movement in a predetermined movement range. The predetermined movement range is, for example, a range in which the movement unit 70 is movable along the Y-axis, and is an interval between the reference position and the termination position of the main frame 71. According to this configuration, a height position of the medium M can be detected based on a detection state of the height detector 20 while the movement unit 70 is caused to move, and the detected height can be stored.

The recording device 1 according to the present exemplary embodiment includes the medium support portion 31*m*, the recording unit 80, and the movement unit 70 that moves relative to the medium support portion 31*m* along the first axis. The recording device 1 includes the contact plate 24 that is provided at the lower end of the movement unit 70 and rotatable relative to the movement unit 70, the displacement sensor 27 that detects a displacement of the contact plate 24, and the height movement mechanism that changes the height of the medium support portion 31*m* relative to the movement unit 70. A method for controlling the recording device 1 moves the movement unit 70 in either the first direction along the first axis, or the second direction opposite to the first direction. Further, when the displacement sensor 27 detects that the contact plate 24 contacts the medium M and rotates while the movement unit 70 moves, the movement of the movement unit 70 is interrupted, and the height of the medium support portion 31*m* is reduced by the height movement mechanism. Then, the movement of the movement unit 70 is caused to resume, and a change amount of the height of the medium support portion 31*m* when the displacement sensor 27 detects that the contact plate 24 rotates, is set to a change amount that varies depending on whether the movement direction of the movement unit 70 is the first direction or the second direction.

According to this configuration, it is possible to detect the height of the medium M by detecting whether the contact plate 24 contacts the medium M while the movement unit 70 is caused to move or not. Since the contact plate 24 is at a position overlapping the medium support portion 31*m* in the X-axis orthogonal to the movement direction of the movement unit 70, for example, it is not necessary to provide the height detector 20 at a position protruding from the movement unit 70 in the X-axis direction. Therefore, it is possible to detect the height of the medium M without providing a member protruding around the table 31. Then, the recording device 1 can detect the height position of the medium M based on the detection state of the height detector 20 while the movement unit 70 is caused to move, and the detected height can be stored.

7. Other Exemplary Embodiments

The above exemplary embodiment merely describes a specific example in which the present disclosure is applied. The present disclosure is not limited to the configurations in the exemplary embodiment described above, and can be implemented in various aspects without departing from the gist of the disclosure.

For example, as the configuration in which the recording device 1 moves the movement unit 70 along the Y-axis, the configuration has been described in which the frame movement motor 61, the transmission belt 63, the gearbox 65, and the transmission belt 67 are used, but this is an example. For example, the recording device 1 may be configured such that, the first guide shaft 51*a* is constituted by a ball screw, a nut that engages the ball screw is fixed to the first leg portion 73*a*, and the first guide shaft 51*a* is rotated by driving force of the frame movement motor 61. Alternatively, a configuration may be adopted in which driving force is applied to both the first leg portion 73*a* and the second leg portion 73*b* of the main frame 71 to move the movement unit 70 along the Y-axis. Similarly, the transmission mechanism 82 has been described as the configuration in which the recording device 1 causes the recording unit 80 to perform scanning in the X-axis direction, but this is an example. In place of the transmission mechanism 82, a configuration may be adopted in which a ball screw and a nut are used, or the carriage 88 may be moved by a linear motor. In addition, as the configuration for lifting and lowering the table 31, the height movement mechanism 32 has been described in which the lifting/lowering mechanism 39 is driven by the lifting/lowering belt 37, but this is an example. For example, the recording device 1 may be configured to lift and lower the table 31 by a rack-and-pinion mechanism. The medium support portion 31*m*, which is the upper surface of the table 31, is not limited to a plane. For example, the table 31 may be a seat including a holding tool such as a claw or a belt that holds the medium M. Further, the medium support portion 31*m* may be, for example, a recessed portion into which the medium M is fitted. The other mechanical configurations of the recording device 1 can be changed appropriately to a configuration that provides similar effects to those of the present disclosure.

The configuration of the recording device 1 including the frame position sensor 92, the table position sensor 93, and the carriage position sensor 94 illustrated in FIG. 9 is an example. For example, the recording device 1 may be configured to specify a position of the main frame 71 by detecting an amount of rotation of the frame movement motor 61. Similarly, the recording device 1 may be configured to specify a position of the table 31 by detecting an amount of rotation of the lifting/lowering motor 33, or may be configured to specify a position of the carriage 88 by detecting an amount of rotation of the carriage drive motor 87.

Such a configuration may be adopted that at least some of the function blocks illustrated in FIG. 9 are achieved with hardware, or achieved together with hardware and software. The processing unit in the flowchart illustrated in FIG. 10 and FIG. 11 is obtained by dividing processing in accordance with a main processing content to facilitate the understanding of the operation of the recording device 1. Thus, the exemplary embodiment is not limited by a method for dividing processing into processing units and a name illustrated.

What is claimed is:

1. A recording device, comprising:

a medium support portion configured to support a medium;

a recording unit configured to perform recording on the medium;

a movement unit configured to move relative to the medium support portion along a first axis; and a detector attached to the movement unit, wherein the detector includes an arm portion rotatably coupled to the movement unit, a contact portion fixed to one end of the arm portion, and a displacement detector for detecting a displacement of the contact portion, the contact portion is disposed at a position overlapping the medium support portion in a second axis orthogonal to the first axis, the arm portion is at a non-contact position along the first axis when the contact portion does not contact the medium or does not contact the medium support portion, and rotates about a rotational movement shaft by the contact portion contacting the medium while the movement unit moves, and the displacement detector detects whether the arm portion is at the non-contact position or not.

2. The recording device according to claim 1, comprising a biasing member configured to bias the arm portion in a direction such that the arm portion does not deviate from the non-contact position.

3. The recording device according to claim 1, wherein the contact portion is attached to a lower end of the movement unit, and a lower end of the contact portion protrudes below the arm portion.

4. The recording device according to claim 3, comprising a height movement mechanism configured to change a height of the medium support portion relative to the movement unit; and a control unit configured to operate the height movement mechanism, wherein the movement unit is configured to move in a first direction along the first axis, and in a second direction opposite to the first direction, and the control unit when detecting that the arm portion is not at the non-contact position by the displacement detector while the movement unit moves in the first direction or the second direction, reduces the height of the medium support portion by the height movement mechanism, and varies a change amount of the height of the medium support portion depending on a movement direction of the movement unit when detecting that the arm portion is not at the non-contact position by the displacement detector.

5. The recording device according to claim 4, wherein a rotational movement shaft of the arm portion is located behind the contact portion when the movement unit moves in the first direction, and the control unit sets, to a first change amount, a change amount of the height of the medium support portion when the movement direction of the movement unit is the first direction, and sets, to a second change amount less than the first change amount, a change amount of the height of the medium support portion when the movement direction of the movement unit is the second direction.

6. The recording device according to claim 5, wherein a difference between the first change amount and the second change amount is determined corresponding to a difference between a position of the contact portion at the non-contact position, and a position of the contact portion when the contact portion descends along with rotation of the arm portion.

7. The recording device according to claim 6, wherein the control unit moves the movement unit in the first direction or the second direction, interrupts the movement of the movement unit when detecting that the arm portion is not at the non-contact position by the displacement detector during the movement of the movement unit, after the height of the medium support portion is reduced by the height movement mechanism, resumes the movement of the movement unit, and stores the height of the medium supporting portion when the movement unit completes movement in a predetermined movement range.

8. The recording device according to claim 5, wherein a difference between the first change amount and the second change amount is determined corresponding to a rotational radius when the contact portion rotates about the rotational movement shaft of the arm portion.

9. A method for controlling a recording device including a medium support portion for supporting a medium, a recording unit for recording on the medium, a movement unit configured to move relative to the medium support portion along a first axis, a contact portion provided at a lower end of the movement unit and rotatable with respect to the movement unit, a displacement detector for detecting a displacement of the contact portion, and a height movement mechanism for changing a height of the medium support portion relative to the movement unit, the method for controlling comprising:

moving the movement unit in either a first direction along the first axis, or a second direction opposite to the first direction while the arm portion of the contact portion is at a non-contact position along the first axis when the contact portion does not contact the medium or does not contact the medium support portion;

interrupting the movement of the movement unit when the displacement detector detects that the contact portion is not at the non-contact position when the contact portion contacts the medium and rotates while the movement unit moves;

reducing the height of the medium support portion by the height movement mechanism;

causing the movement unit to resume the movement; and causing a change amount of the height of the medium support portion when the displacement detector detects that the contact portion rotates to be a change amount varying depending on whether a movement direction of the movement unit is the first direction or the second direction.

* * * * *